United States Patent [19]
Otto

[11] Patent Number: 5,077,089
[45] Date of Patent: Dec. 31, 1991

[54] INFRARED BURNER

[75] Inventor: Nancy M. Otto, Clay, N.Y.

[73] Assignee: Carrier Corporation, Syracuse, N.Y.

[21] Appl. No.: 401,305

[22] Filed: Aug. 31, 1989

Related U.S. Application Data

[62] Division of Ser. No. 306,128, Feb. 6, 1989, Pat. No. 4,878,837.

[51] Int. Cl.$^5$ .......................... B05D 3/02; B05D 5/00
[52] U.S. Cl. .................................... 427/226; 427/245; 427/247; 427/294; 427/295; 427/435
[58] Field of Search ............... 427/226, 245, 247, 295, 427/435, 294

[56] References Cited

U.S. PATENT DOCUMENTS

| 4,384,014 | 5/1983 | Young | 427/295 |
| 4,612,240 | 11/1986 | Johnson et al. | 427/427 |
| 4,735,757 | 4/1988 | Yamato et al. | 427/2 |
| 4,741,813 | 5/1988 | Schultz | 427/295 |

Primary Examiner—Janyce Bell

[57] ABSTRACT

An infrared burner with an extremely low pressure drop is described. The burner comprises a corrosion resistant mesh screen having a thick porous coating of ceramic fibers deposited thereon. In addition to a low pressure drop the burner has structural integrity and ability to generate energy at a high rate. The burner is produced by admixing ceramic fibers with a polymeric material which burns off upon heating.

1 Claim, 1 Drawing Sheet

INFRARED BURNER

This application is a division of application Ser. No. 306,128, filed Feb. 6, 1989, now Pat. No. 4,878,837.

TECHNICAL FIELD

The field of art to which this invention pertains is infrared burners, and specifically composite infrared burners.

BACKGROUND ART

Radiant energy burners made up of a supporting screen coated with a mixture of ceramic fibers are known. In operation the fibers are assembled such that they are permeable to gaseous fuel and the fuel is combusted on the outer surface of the element to primarily emit radiant energy. A variety of designs and methods for making such burners is described in the art, note U.S. Pat. Nos. 3,179,156; 3,275,497; 4,519,770; 4,599,066; and 4,721,456. However, there is a constant search in this art for more efficient burners as energy costs rise.

DISCLOSURE OF INVENTION

An infrared burner is described comprising a corrosion resistant mesh screen having deposited thereon a thick porous coating of ceramic fibers. The fibers are selected in size and distribution so that the resultant burner has structural integrity, and the ability to release energy at the rate of 80,000 to 100,000 BTUs per sq.ft. per hour. The porosity of the fiber laying is such as to produce a difference in pressure drop during operation of less than 0.4 inch of water and a pressure drop cold versus hot of less or equal to 0.20 inch of water.

Another aspect of the invention is a method of making such burners comprising admixing colloidal alumina, ceramic fibers, and a decomposable polymeric material in a carrier. The mixture is kept uniformly suspended and a mesh screen substrate is immersed into the mixture A vacuum is pulled through the screen for a period of time sufficient to deposit a coating up to 0.5 inch thick. Following deposition, the coating is heated to decompose the polymeric material on the surface of the coating and produce a porous coating on the screen. The resultant article has the properties described above, in addition to being smooth and structurally stable.

The foregoing and other features and advantages of the present invention will become more apparent from the following description and accompanying drawings.

BEST MODE FOR CARRYING OUT THE INVENTION

Figure 1:
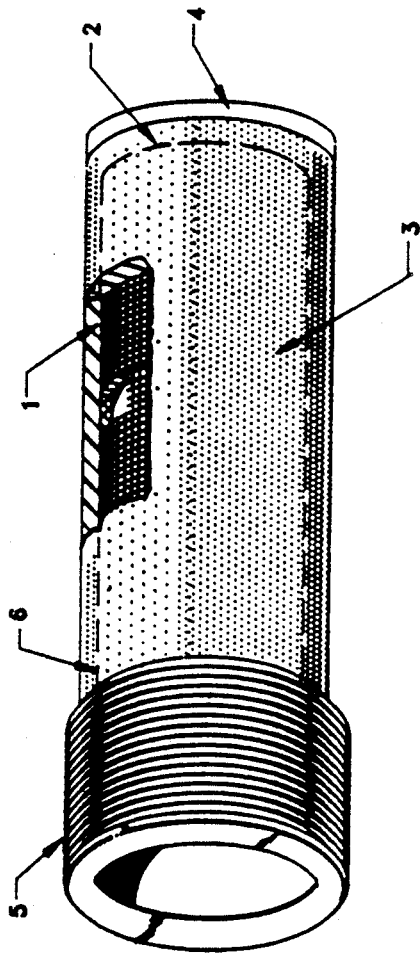
FIG. 1 shows an infrared burner according to the present invention.

The mesh screen can be any material which is corrosion resistant under the gas and heat environment prevalent with an infrared burner of this type. Commercially available stainless steel is most preferred. While any mesh size opening sufficient to hold the ceramic fibers while allowing adequate porosity to accomplish the purposes of the invention can be used, mesh sizes less than 0.25 inch on a side are preferred, 0.125 inch on a side being most preferred.

The ceramic fibers used are preferably commercially available high temperature stable fibers such as alumina and silica These can be purchased from such sources as C & E Refractories, Buffalo, New York. A key to the desired porosity is the fiber length. The fibers deposited by the current process should be less than 0.25 inch and preferably about 0.125 inch in length (average fiber length) The fibers are typically deposited on the screen at a thickness of about 0.25 to about 0.5 inch thick. (If the coating is too thin the screen will heat up during operation). The mesh screen is typically formed into a cylinder with an end cap which is preferably circular, although square, rectangular, or oval cross sectional area containers are also usable. It should also be noted that, e.g. such things as donut or spherical shapes can be used depending on the heat exchanger shape.

The ceramic fibers are typically about 2 inches long as purchased and their ultimate particle size is determined by chop-time. They are typically chopped to the proper length in a conventional high speed chopper (e.g. Oster blender) The ceramic fibers are typically a mixture of alumina and silica, with up to 70% by weight silica, and typically 51% alumina and 49% silica.

The ceramic fibers are deposited out of a slurry which must be uniformly dispersed in order to produce a uniform coating with uniform emissive properties. Use of a sparger best produces such a mixture By sparging the container containing the ceramic fiber slurry with a non-reactive gas such as air pumped (typically at about 10 to 15 p.s.i. mercury) through a plate or tubing at the bottom of the vat, the mixture is better kept in suspension providing for uniform distribution of the components in the mixture onto the screen. A system of paddles may also be used. Also, by virtue of the sparging in this fashion it is believed that small bubbles may be trapped in the fiber matrix as it is deposited, further contributing to the porosity of the mat on the burner screen. This assists in obtaining the low pressure drop. Other deposition methods can also be used, e.g. spraying, but uniform coating is essential.

Polymeric particles which decompose upon heating are admixed with the ceramic fibers in order to produce the requisite porosity after being burned off. Acrylic polymers have been found to be best suited to this, with polymethylmethacrylate being preferred. These particles are typically 20 to 40 mesh (0.18 to 0.2 inch in diameter). If the particles are significantly smaller than this, it appears that the pressure drop will increase, while if the particles are significantly larger than this, the structural integrity of the burner will suffer. The particles assist the fibers in flowing during deposition almost acting as a lubricant further providing for more uniform fiber laying.

The polymeric material is designed to ideally burn off at about 275° C. Complete burning can be detected as the film on the outside of the burner goes through a black char to white stage. This can be removed by brushing off the outer surface, for example with a paint brush. Burning is typical accomplished by running a gas such as a natural gas-air mixture through the burner with an excess of air. The gas-air mixtures used in the burner for decomposing the polymer, operating the burner, and generating the pressure measurements recited throughout is typically a mixture of more than 10 parts of air to 1 part of fuel (e.g. natural gas - 96% methane, and a propane and butane mix). Typically 10% to 15% excess (required for stoichiometric combustion of the fuel) air is used, or approximately 11 + parts air per part of fuel.

Approximately 1/32 to 1/64 of an inch is all of the surface polymer which is completely removed. The remaining polymer contributes to the structural integrity of the burner while still providing adequate porosity. The decomposition of the polymer takes place as a gradient through the thickness of the coating on the screen. As stated above there is no polymer on the surface of the article to a depth of approximately 1/32 to 1/64 of an inch. As you penetrate the coating towards the screen there is a greater concentration of polymer, although sufficient polymer is removed and decomposed throughout the thickness of the screen to provide the porosity as described herein.

The slurry is made up by acidifying an alumina suspension to keep everything uniformly dispersed. Typically Versal TM alumina (Kaiser. Chemicals, Baton Rouge, LA) is used at a pH of about 2. This produces a homogeneous gel with about a 12% solids content. The fibers may be initially soaked in an acid solution for suspension purposes.

Some aluminum nitrate may also be added to the dispersion to aid in gel formation and wetting of the fibers which can also contribute to structural integrity.

It is important to chop the fibers in the alumina suspension. Chopping the fibers in water and then adding them to the alumina does not produce an adequate wetting of the fibers for good structural integrity of the burner. Typically concentrated Versal alumina is used and after chopping the mix is diluted. This produces stronger bonding characteristics believed to be the result of the alumina attaching to the fibers versus the water attaching to the fibers and then the alumina having to penetrate the water layer. The soaking in Versal alumina is accomplished long enough to coat the fibers, typically 15 to 30 minutes.

The end cap can be produced by merely painting a ceramic slurry onto the top of the screen thick enough (typically ⅛ to ¼ inch) to eliminate any porosity allowing it to withstand the heat but not generate any radiation.

The pressure drop produced is a critical part of the invention. It is important that the pressure drop be very low. In the past, fine fibers were used to produce an even coating, but this resulted in a very high pressure drop across the surface. The problem of just switching to longer fiber lengths is that this can produce adjacent bumps causing localized hot spots. Uniform mixing helps to avoid this. The pressure drop of the burner according to the present invention is less than or equal to 0.4 inch (water) and preferably 0.1 inch to 0.4 inch. The low pressure drop reduces power requirements for an inducer fan resulting in increased energy efficiency The other advantage of the burner according to the present invention is that the pressure drop cold (at startup) versus the pressure drop hot (at operating temperature) has a difference of less than or equal to 0.2 inch and preferably less than or equal to 0.15 inch (water column).

In FIG. 1 which is a perspective view partly broken away and partly in cross-section of a cylindrical mesh screen (1) with a closed end (2), the coating (3) on the side wall portion (1) of the screen is a porous material with a very low pressure drop. The end cap portion (4) is nonporous, i.e. permits no gas flow therethrough. A threaded coupling (5) is attached (e.g. by welding or bonding) at the open end (6) of the cylindrical screen. The coupling can be plastic, steel tube, sheet metal, etc.

Figure 2:
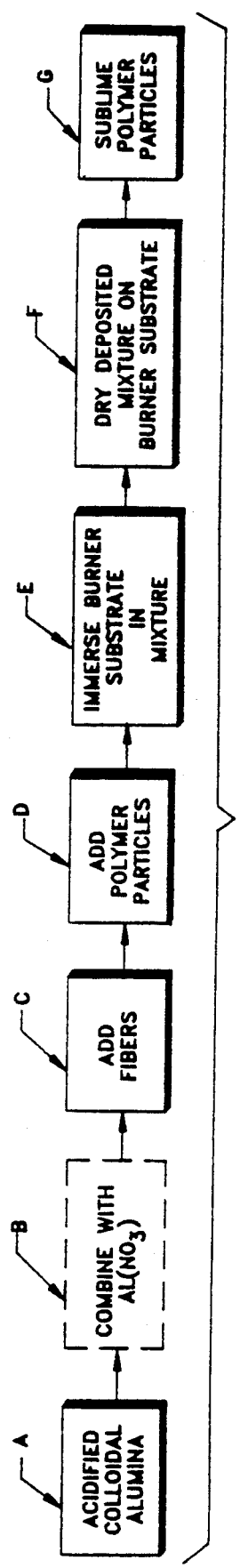
FIG. 2 shows a schematic of the process used to produce the article according to the present invention.

In FIG. 2 a flow chart of the method is described where in step "A" colloidal alumina is acidified typically to a pH of less than 2, e.g. using glacial acetic acid. (The carrier used throughout the process is preferably water, although alcohols can be used.) This forms a gel at this pH. In step "B", optionally, aluminum nitrate can be added to the mixture as a solution in water to improve wetting and bonding of the fibers. In step "C" the fibers are also added to the mixture. Although the fibers can be chopped in a carrier such as water and added to the mixture it is preferable to add the fibers in the as-purchased or as-delivered length (typically 2 to 3 inches) and chop the fibers in the slurry. This seems to produce a better wetting of the fibers by the mixture. At this point the pH is again adjusted, this time to neutral with ammonium hydroxide to maintain the gel but reduce corrosiveness of the mixture.

In step "D" polymeric particles are added to the mixture and evenly dispersed therein In step "E" the screen shown in FIG. 1 is immersed in the solution and a constant, controlled vacuum pulled (typically −5 to −20 inches mercury) to deposit an even coating on the substrate (typically less than 15 seconds). This is followed in step "F" by drying the deposited coating. This drying takes place over the course of approximately an hour in an oven starting at room temperature and ending at a temperature of approximately 325° C. Over the course of this gradient the water or other carrier is first removed followed by sublimation of the particles, particularly on the inner surface of the coating. Finally, in step "G" polymeric particles at the surface are burned off providing a porous coating. This burning takes place by operating the burner at its standard operating-firing conditions. This is typically done under a nitrogen gas or other inert atmosphere.

EXAMPLE

In the following example the ingredients make approximately 3000 grams of solution, which is sufficient to coat a burner screen 2 inches in diameter and 12 inches long (0.8 square foot surface area).

Procedure to make a double batch:
1) Prepare acidified Versal 900 by mixing 120 g of powder to 880 g water in blender and then acidify to pH<2 using glacial acetic acid. A gel should form at this pH.
2) Prepare 14% Al(NO$_3$)$_3$ by mixing 140 g of the nitrate to 860 g of water in a volumetric flask.
3) Take 60 g of #1 above and add 200 g of #2 above and mix for one minute on high speed in Oster blender.
4) Add 600 g of water to blender and mix at high speed for one minute. Empty all solution into another container.
5) Weigh 10 g of fiber and 200 to 250 g of mixture from number 4 above into blender container and blend at high speed for approximately 40 seconds. This is repeated 4 times (for a total of 40 g of fiber). The target fiber length is approximately ⅛ inch. Typically after blending if the slurry is lumpy you must blend for a longer period of time. If when applying the fibers to the screen they do not stick, it is an indication that a shorter blend time must be used.
6) Dilute to 3000 ml with water
7) Add 200 grams of methyl methacrylate beads and mix (paddles or sparger) until beads are evenly dispersed.
8) Add indicator (methyl red or bromocresyl purple) and adjust pH to neutral (6.5) with ammonium hydroxide. Color change will be from red or purple to yellow.

9) Pour solution into vacuum forming vessel of adequate size and use air sparger or paddles to keep fibers/methacrylate evenly mixed in solution.
10) Form burner while solution is being mixed or within minutes (e.g. 10) after mixing.
11) Dry burner at room temperature for 60 minutes.
12) Sublime methyl methacrylate in oven at 325° C. temperature for at least 8 hours.
13) Ignite the burner at operating conditions allowing the methacrylate on the outer surface to burn off completely.
14) Brush off the white film of alumina binder from the outer surface of the burner.

In addition to having a low pressure drop both during operation and cold versus hot, the infrared burners of the present invention have structural integrity, and ability to generate energy at a high rate. This makes for a very energy efficient system. Examples of the advantages a low pressure drop cold versus hot produces are: (1) only one inductor fan is necessary for both startup and normal operating conditions in a furnace-type environment for this type of a burner; (2) only one sensor is needed for the fans speed; (3) smaller inductor fan can be used; (4) a multi-speed motor is not necessary; and (5) there are fewer control complications in such a system. It should also be noted that with a burner according to the present the structural integrity has resulted in over 4,000 hours of testing without structural integrity failure. One of the keys to the present invention is the balance of properties obtained, a balance of surface smoothness, structural integrity, and the pressure drops recited.

Although this invention has been shown and described with respect to detailed embodiments thereof, it will be understood by those skilled in the art that various changes in form and detail thereof may be made without departing from the spirit and scope of the claimed invention.

I claim:

1. A method of making an infrared burner comprising admixing colloidal alumina, ceramic fibers, and a decomposable polymeric material, wherein the ceramic fibers consist essentially of alumina and silica with silica being present in an amount from 0 to 70% by weight and alumina being present in an amount from 30 to 100% by weight and wherein the polymeric material has a particle diameter generally from 0.18 to 0.2 inch, keeping the mixture uniformly suspended, immersing a corrosion resistant mesh screen into the mixture, and pulling a vacuum on the screen for a period of time sufficient to deposit a coating approximately 0.25 to 0.5 inch thick, followed by heating the deposited coating to decompose a surface layer of the polymeric material and produce a porous coating on the screen having structural integrity, ability to generate energy at the rate of 80,000 BTU to 100,000 BTU per sq. ft. per hour, a pressure drop during operation of up to 0.4 inch of water, and a pressure drop cold versus hot of up to 0.2 inch of water.

* * * * *